United States Patent
Yang (10) Patent No.: US 6,814,455 B1
(45) Date of Patent: Nov. 9, 2004

(54) MIRROR DIAGONAL AND METHOD OF MANUFACTURING THE SAME

(76) Inventor: William T. Yang, 10 F, No. 42-1 Huanho Road, 231 Hsintien City, Taipei County (TW)

( * ) Notice: Subject to any disclaimer, the term of this patent is extended or adjusted under 35 U.S.C. 154(b) by 0 days.

(21) Appl. No.: 10/615,790

(22) Filed: Jul. 10, 2003

(51) Int. Cl.[7] .............................................. G02B 7/182

(52) U.S. Cl. ..................................................... 359/871

(58) Field of Search ................................ 359/871, 872, 359/838

(56) References Cited

U.S. PATENT DOCUMENTS 3,676,938 A * 7/1972 Trehub ........................ 250/555

* cited by examiner

Primary Examiner—Euncha P. Cherry
(74) Attorney, Agent, or Firm—Rabin & Berdo, P.C.

(57) ABSTRACT

A mirror diagonal made with reduced material to achieve the same reflection effect is manufactured by (a) preparing an extruded aluminum tube having a bottom and two slant faces; (b) cutting the extruded aluminum tube to provide a plurality of short sections having a desired length and two open lateral sides, so that each short section forms a housing for the mirror diagonal; (c) processing each housing in predetermined manners; (d) adhering a reflection mirror to the bottom in each housing; (e) sealing the two open lateral sides of each housing with two sealing covers; and (f) mounting first and second tubes in two tube mounting holes separately provided on the two slant faces of each housing.

8 Claims, 11 Drawing Sheets

MIRROR DIAGONAL AND METHOD OF MANUFACTURING THE SAME

FIELD OF THE INVENTION

The present invention relates to a mirror diagonal that has reduced weight and accordingly lower manufacturing cost. The present invention also relates to a method of manufacturing the weight-reduced mirror diagonal.

BACKGROUND OF THE INVENTION

Figure 1:
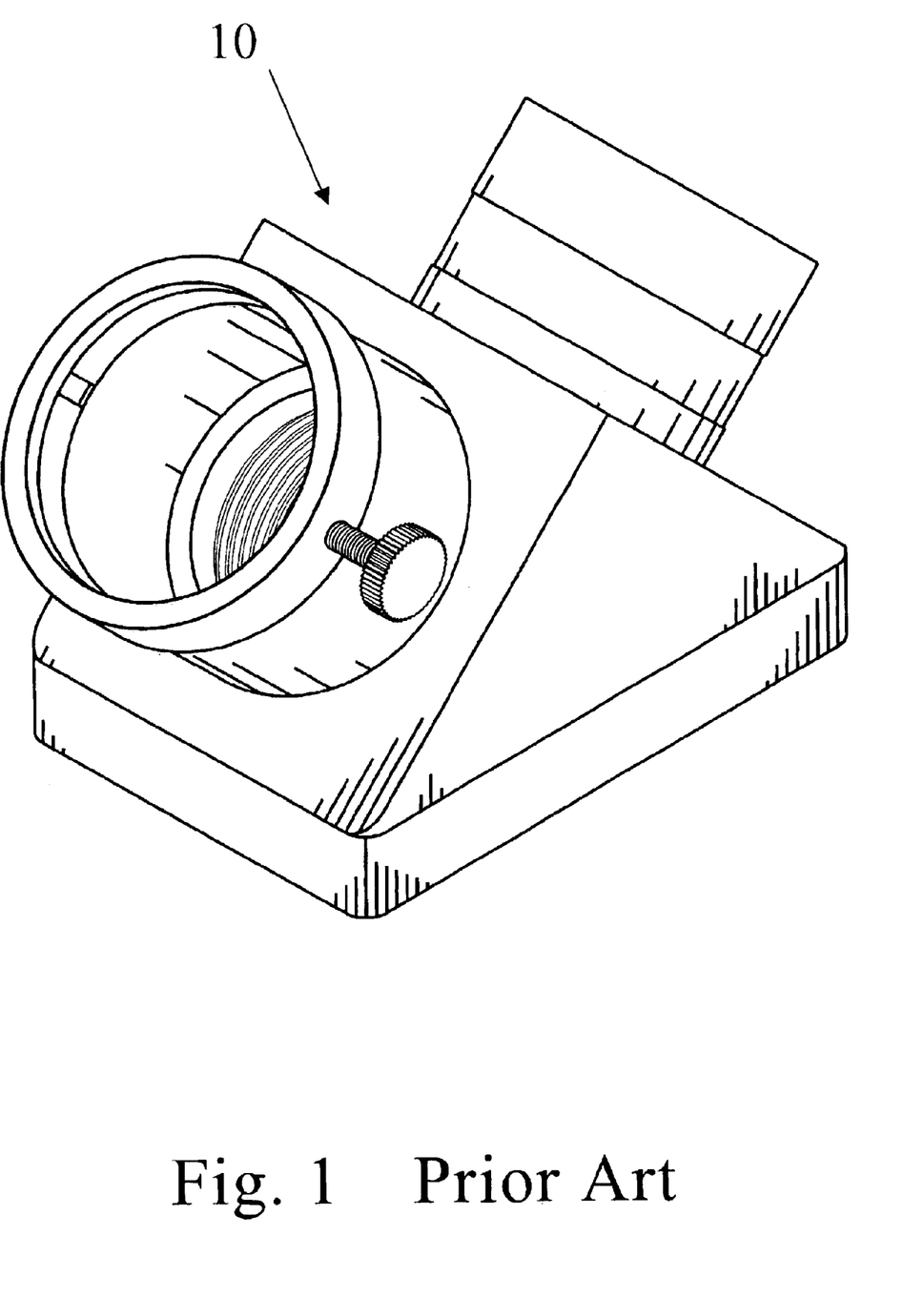
FIG. 1 is an assembled perspective view of a conventional mirror diagonal.
Figure 2:
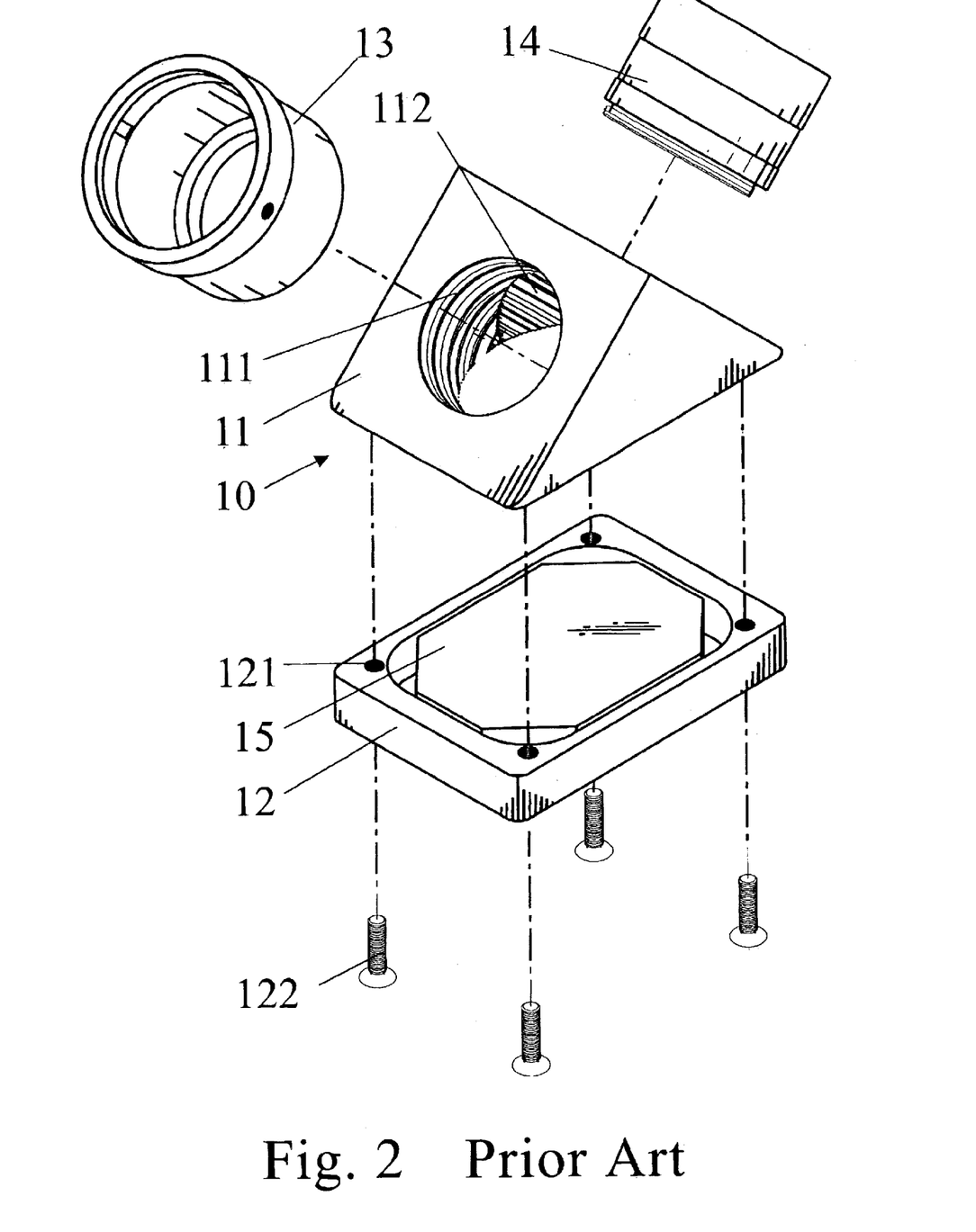
FIG. 2 is an exploded perspective view of FIG. 1.

FIGS. 1 and 2 are assembled and exploded perspective views, respectively, of a conventional mirror diagonal 10. As shown, the conventional mirror diagonal 10 mainly includes a body 11, a seat 12, a first tube 13, a second tube 14, and a reflection mirror 15. The body 11 is provided with a first and a second internally threaded hole 111, 112. The seat 12 is provided at predetermined positions with a plurality of mounting holes 121, so that the seat 12 is connected to a bottom of the body 11 by threading screws 122 through the mounting holes 121 into the body 11. The reflection mirror 15 is adhered to a top of the seat 12.

Figure 7:
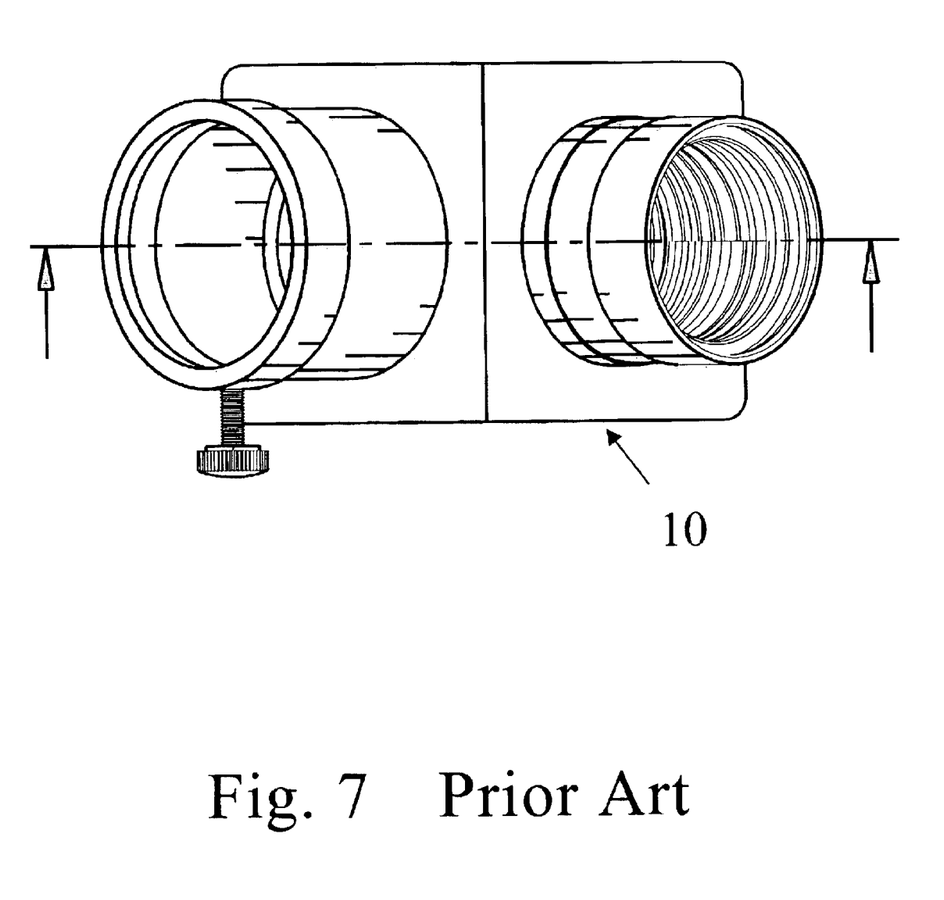
FIG. 7 is a top view of the conventional mirror diagonal of FIG. 1.
Figure 8:
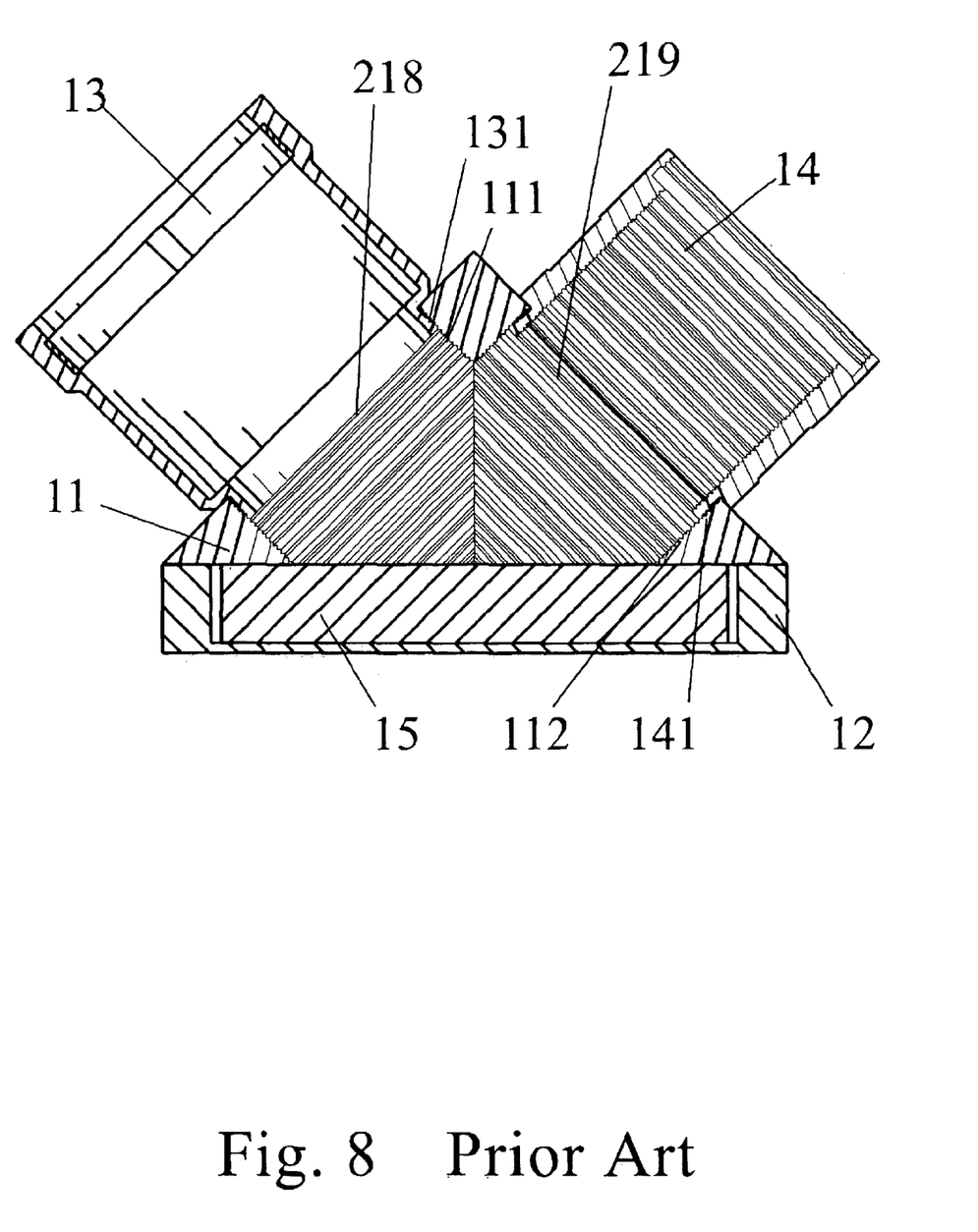
FIG. 8 is a sectioned side view of the conventional mirror diagonal of FIG. 1.

FIGS. 7 and 8 are top and sectioned side views, respectively, of the conventional mirror diagonal 10.

Please refer to FIGS. 7 and 8. The first tube 13 is screwed into the first threaded hole 111 provided on the body 11, and the second tube 14 into the second threaded hole 112.

Figure 5:
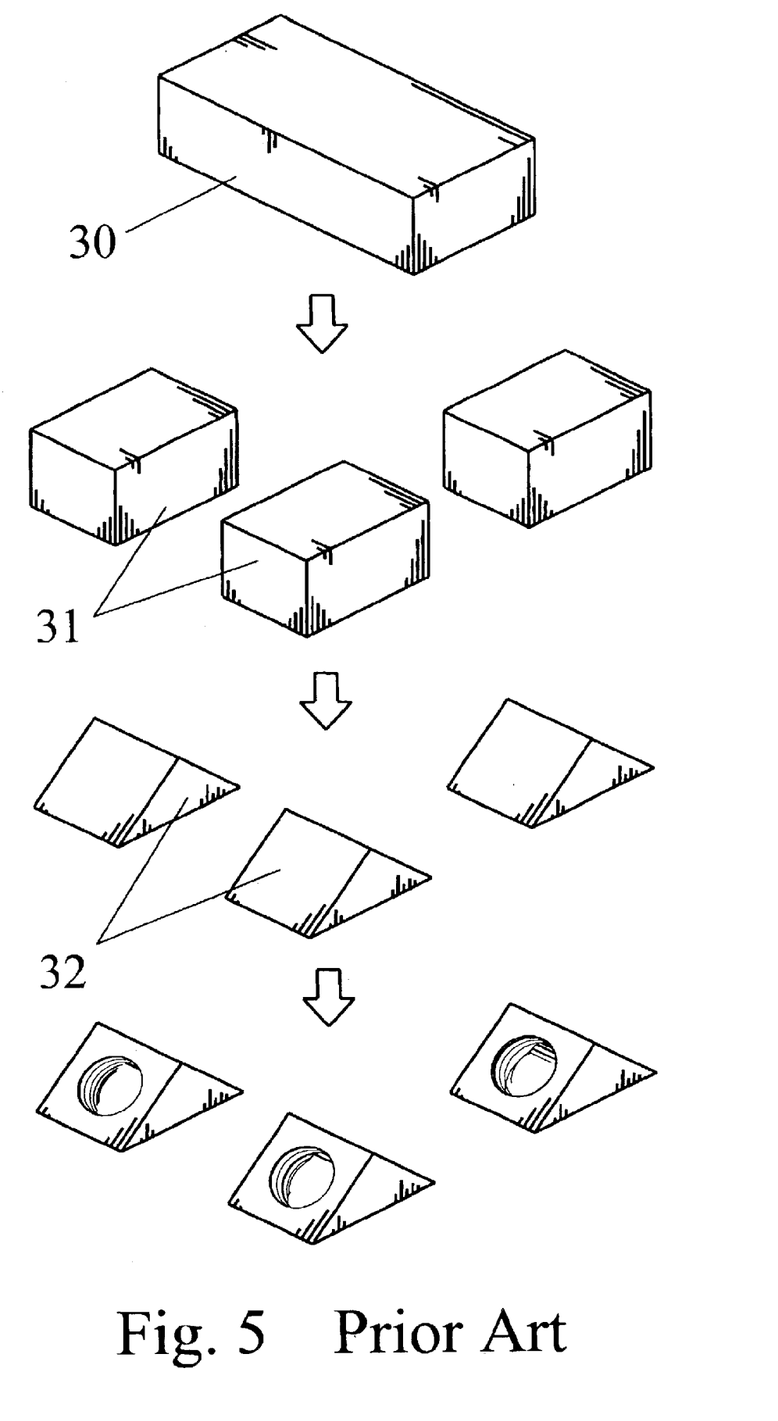
FIG. 5 shows the manner of manufacturing a body for the conventional mirror diagonal of FIG. 1.

FIG. 5 shows the manner of manufacturing the body 11 for the conventional mirror diagonal 10. The body 11 is made by cutting a long bar of solid aluminum material 30 into a plurality of small sections 31, which are individually processed in predetermined manners to form a plurality of aluminum prisms 32 having two slant faces. The aluminum prisms 32 are then properly processed, including drilling and tapping on the two slant faces.

Researches in astronomical field have been quickly developed since Rene Descartes invented the coordinate geometry. Today, amateur astronomical observers and the general public have played important roles in astronomical observation, and different grades of mirror diagonals are easily available in the market. However, from careful studies of the components forming the existing mirror diagonals, one would surprisingly find too much material is unnecessarily used to produce the mirror diagonals.

It is therefore tried by the inventor to develop a mirror diagonal that is manufactured with less material and therefore has reduced overall weight and manufacturing cost.

SUMMARY OF THE INVENTION

In one aspect of the present invention, there is provided a mirror diagonal having reduced overall weight and accordingly reduced manufacturing cost.

In another aspect of the present invention, there is provided a method of manufacturing mirror diagonal to reduce an overall weight and manufacturing cost thereof.

The method of the present invention for manufacturing a weight-reduced mirror diagonal mainly includes the steps of: (a) preparing an extruded aluminum tube having a predetermined cross-sectional shape to provide a bottom and two slant faces; (b) cutting the extruded aluminum tube to provide a plurality of short sections having a desired length and two open lateral sides, so that each short section forms a housing for the mirror diagonal; (c) processing each housing in predetermined manners; (d) adhering a reflection mirror to the bottom in each housing; (f) sealing the two open lateral sides with two-sealing covers; and (g) mounting a first and a second tube in two tube mounting holes formed on the two slant faces of each housing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 3:
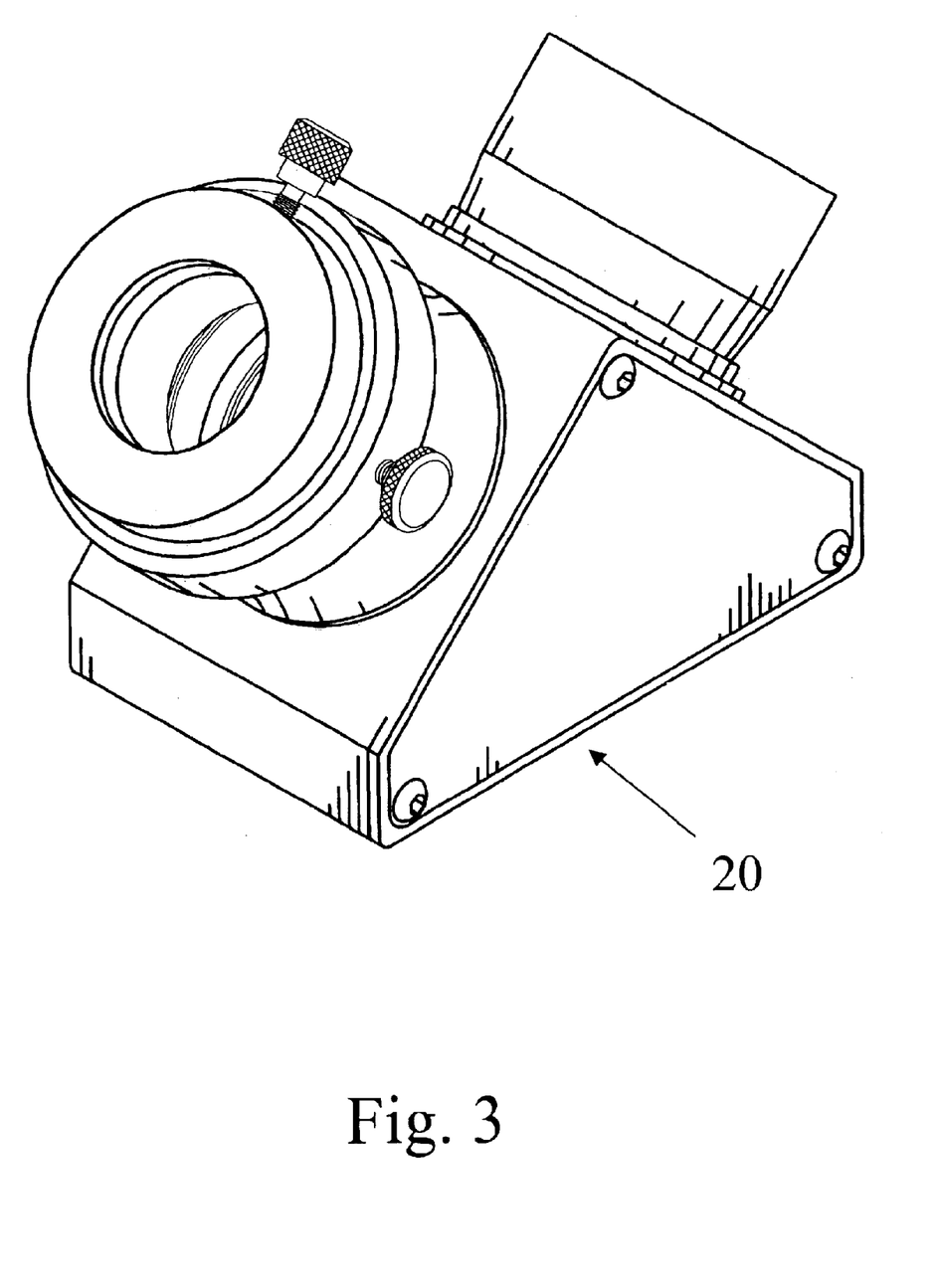
FIG. 3 is an assembled perspective view of a mirror diagonal according to the present invention.
Figure 4:
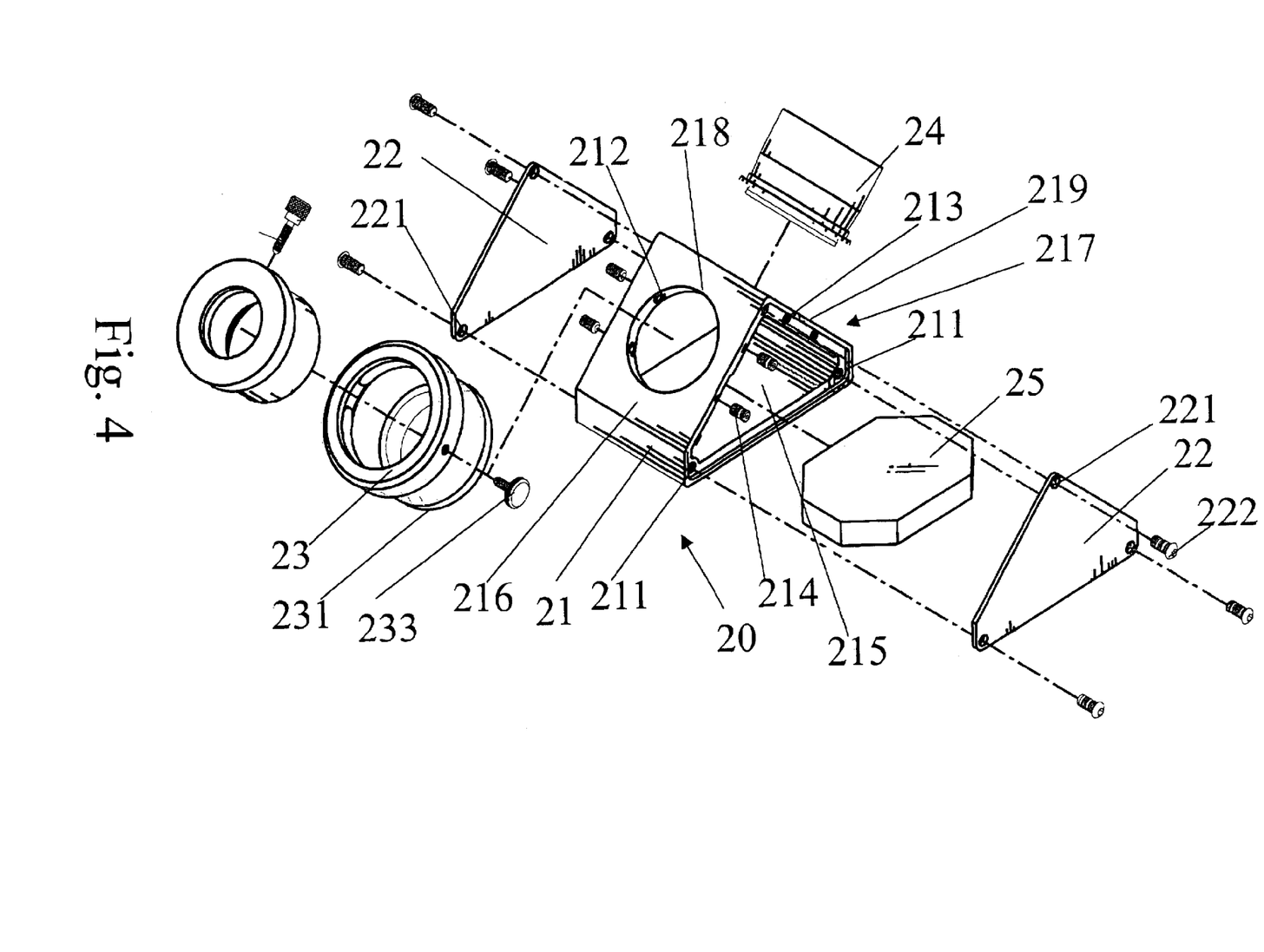
FIG. 4 is an exploded perspective view of FIG. 3.

Please refer to FIGS. 3 and 4 that are assembled and exploded perspective views, respectively, of a mirror diagonal 20 according to the present invention. As shown, the mirror diagonal 20 mainly includes a housing 21, two sealing covers 22, a first tube 23, a second tube 24, and a reflection mirror 25.

The housing 21 is a hollow tubular member made of an aluminum extrusion having a bottom seat 215, a first slant face 216 having a first tube mounting hole 218 formed thereon, a second slant face 217 having a second tube mounting hole 219 formed thereon, and two lateral sides formed into two openings. The two sealing covers 22 are in the same shape as that of the two open sides of the housing 21 but have dimensions slightly smaller than the two open sides, so as to be fitly mounted on the two open sides to seal the same. The first tube 23 is mounted on the first slant face 216, and the second tube 24 is mounted on the second slant face 217. The reflection mirror 25 is mounted in the housing 21 on the bottom seat 215.

Figure 10:
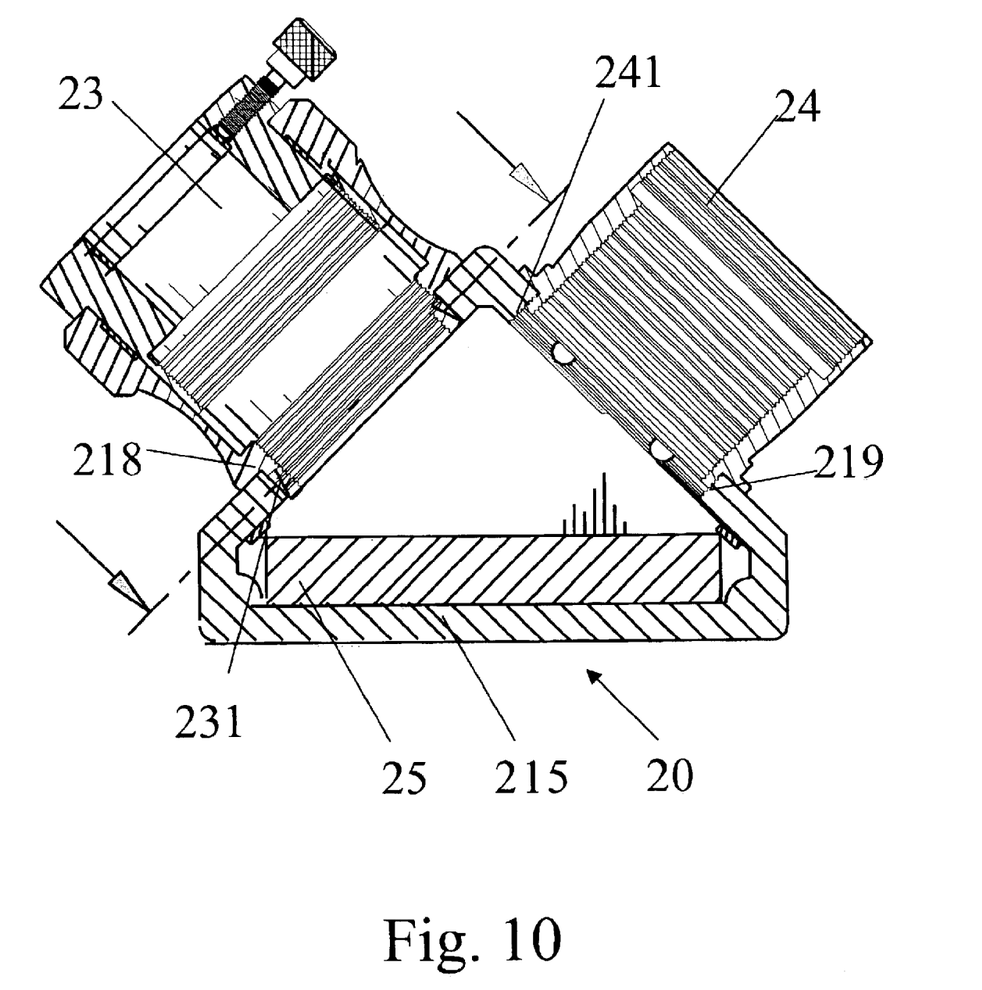
FIG. 10 is a sectioned side view of the mirror diagonal of the present invention.
Figure 11:
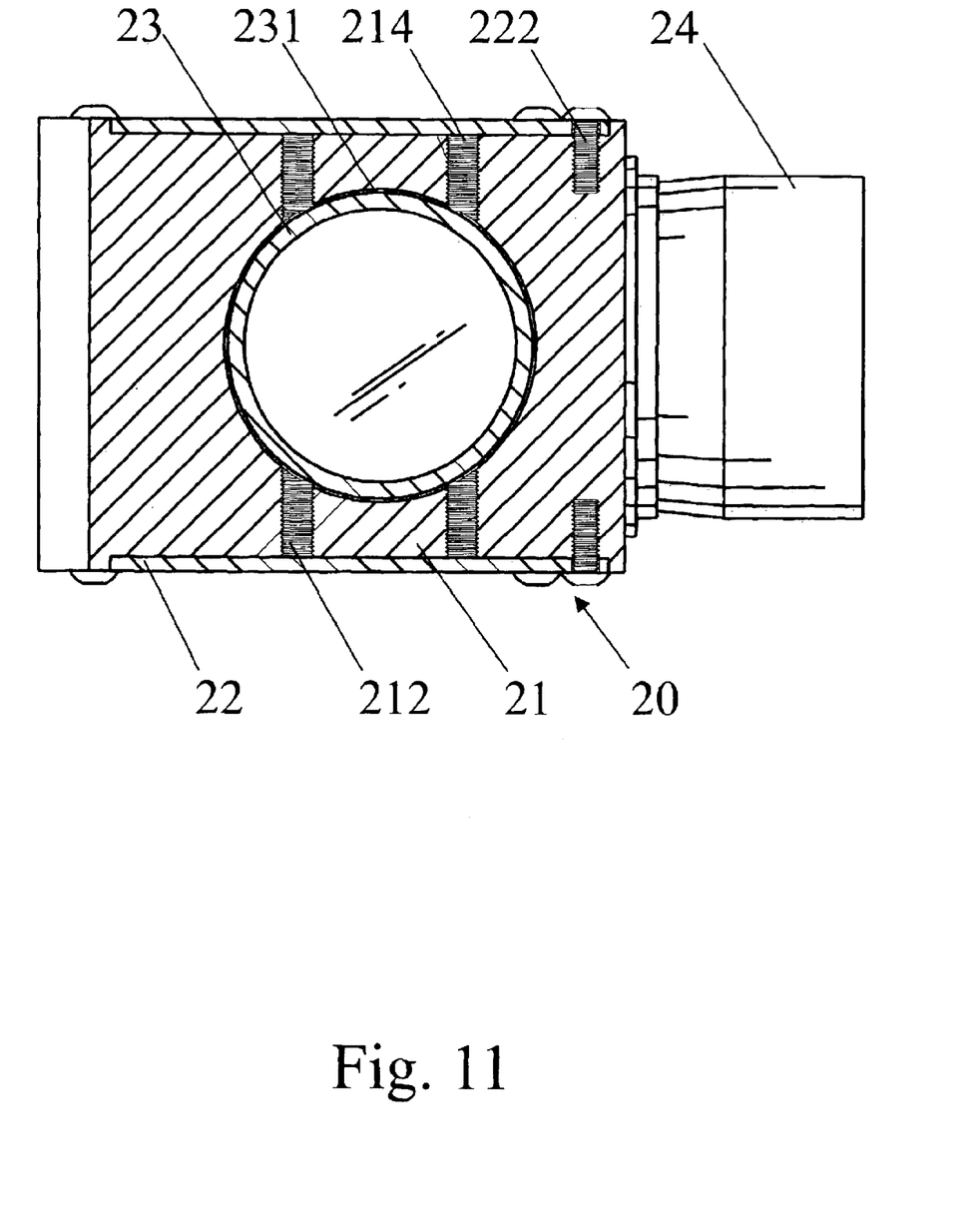
FIG. 11 is a sectioned front view of the mirror diagonal of the present invention.

FIGS. 10 and 11 are sectioned side and front views, respectively, of the mirror diagonal 20 of the present invention. Please refer to FIGS. 3, 4, 10, and 11 at the same time. The housing 21 is provided at the two open sides with a plurality of side screw holes 211, and at the first and the second slant face 216, 217 with a plurality of first and second locating screw holes 212 and 213, respectively. Side sealing screws 222 are separately extended through mounting holes 221 on the sealing covers 22 into the side screw holes 211 to connect the sealing covers 22 to the housing 21 and seal the two open lateral sides thereof.

Figure 9:
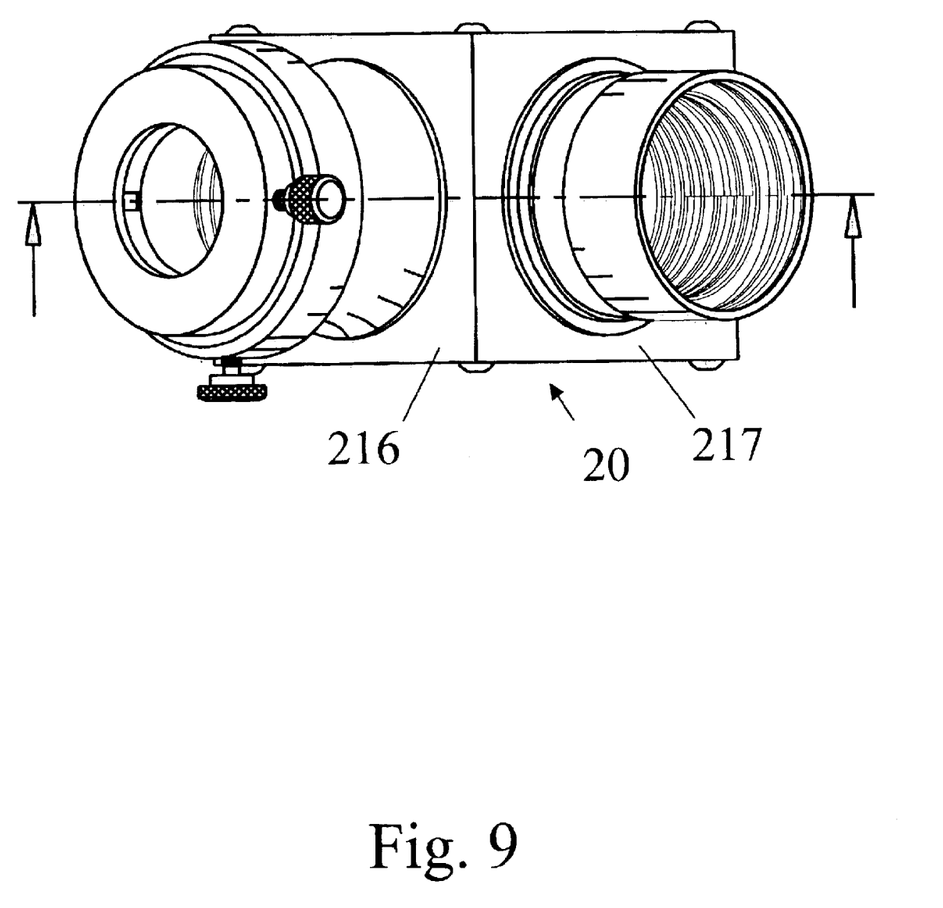
FIG. 9 is a top view of the mirror diagonal of the present invention.

FIG. 9 is a top view of the mirror diagonal 20 of the present invention. Please refer to FIGS. 9, 10, and 11 at the same time. The first tube 23 is provided at a rear end with a flared neck portion 231 that has a reduced outer diameter for fitly receiving in the first tube mounting hole 218 on the first slant face 216. When the first tube 23 is fitted in the first tube mounting hole 218, the flared neck portion 231 is just located at a position aligned with the first screw holes 212 provided at the first slant face 216. By threading locating screws 214 into the first locating screw holes 212 to press against the flared neck portion 231 of the first tube 23, the first tube 23 is firmly held in the mounting hole 218. When it is desired to rotate the first tube 23, simply loosen the locating screws 214 from the first locating screw holes 212 and then rotate the first tube 23. When the first tube 23 is rotated and held in place again with the locating screws 214, a clamp screw 233 on the first tube 23 may be changed to a desired operating position.

In the illustrated embodiment of the present invention, the second tube 24 is screwed into the second tube mounting hole 219 on the second slant face 217 of the housing 21, though the second tube 24 may be connected to the second tube mounting hole 219 in the same manner as the first tube 23. Moreover, the effect that is achieved through the new manner of mounting and holding the first tube 23 in the first tube mounting hole 218 with the locating screws 214 would not be adversely affected by the second tube 24 when the latter is directly screwed into the second tube mounting hole 219.

Figure 6:
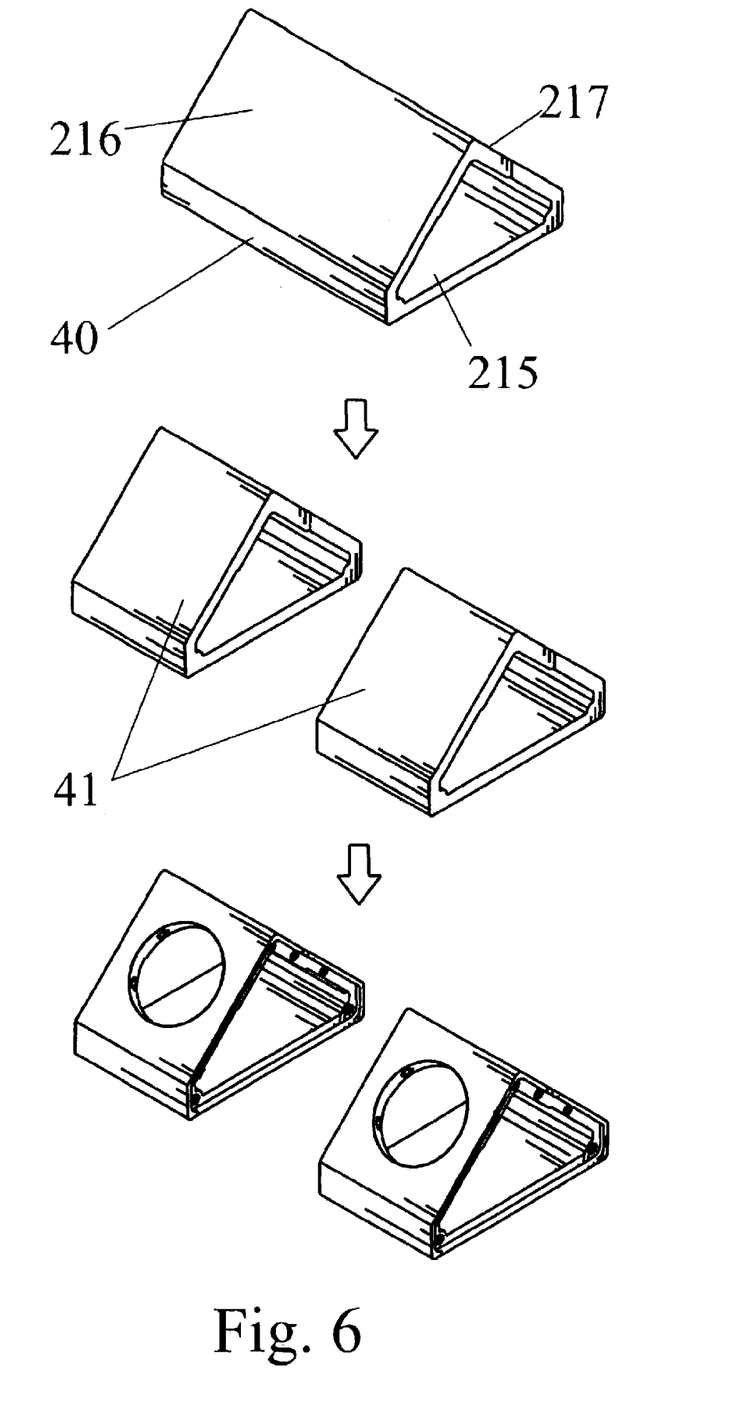
FIG. 6 shows the manner of manufacturing a housing for the mirror diagonal of the present invention.

Please now refer to FIG. 6 that shows the manner of manufacturing the housing 21 for the mirror diagonal 20 of the present invention. First, a length of extruded aluminum tube 40 having a predetermined cross-sectional shape is prepared. The extruded aluminum tube 40 is then cut into a plurality of shorter aluminum tubes 41 having a desired length and two open lateral sides, so that each of the shorter aluminum tubes 41 forms a housing 21 for the mirror diagonal 20. The housings 21 are then processed in predetermined manners, including cutting a tube mounting hole 218, 219 on each of two slant faces 216, 217 of each housing 21, and drilling screw holes 212, 213, and 211 at the two slant faces and the two open lateral sides of each housing 21 (refer to FIG. 10). When the housing 21 is completed, a reflection mirror 25 is then adhered to a bottom seat 215 in each housing 21, two sealing covers 22 are connected to the two open sides with screws to seal the open lateral sides (refer to FIGS. 3 and 4), and finally, a first and a second tube 23, 24 are mounted in the tube mounting holes 218, 219 on the slant faces 216 and 217, respectively, of the housing 21.

As can be seen from FIG. 6, the extruded aluminum tube 40 having a predetermined cross-sectional shape to provide a bottom seat 215, a first slant face 216, and a second slant face 217. An angle contained between the first and the second slant face 216, 217 may differently designed depending on actual need. The housing 21 may be further cut, milled, drilled, and/or tapped at predetermined positions for other constituting elements to assemble to the housing 21.

What is claimed is:

1. A mirror diagonal, comprising:
    a housing including a bottom seat, a first slant face having a first tube mounting hole provided thereon, a second slant face having a second tube mounting hole provided thereon, and two open lateral sides;
    two sealing covers mounted to said two open lateral sides to seal the open sides of said housing;
    a first tube mounted in said first tube mounting hole on said first slant face of said housing;
    a second tube mounted in said second tube mounting hole on said second slant face of said housing; and
    a reflection mirror mounted on said bottom seat in said housing.

2. The mirror diagonal as claimed in claim 1, wherein said housing is made of an extruded aluminum tube.

3. The mirror diagonal as claimed in claim 1, wherein said housing is provided at least on said first slant face at predetermined positions thereof with a plurality of screw holes via which locating screws are extended into said first tube mounting hole to press against an outer peripheral surface of said first tube.

4. The mirror diagonal as claimed in claim 3, wherein said first tube is provided at a rear end with a flared neck portion adapted to fitly mount in said first tube mounting hole.

5. The mirror diagonal as claimed in claim 4, wherein said locating screws extended through said screw holes into said first tube mounting hole are pressed against an outer peripheral surface of said flared neck portion of said first tube.

6. A method of manufacturing mirror diagonal, comprising the steps of:
    a. preparing an extruded aluminum tube having a predetermined cross-sectional shape to provide a bottom seat, a first slant face, and a second slant face;
    b. transversely cutting said extruded aluminum tube to provide a plurality of small sections having a predetermined length and two open lateral sides, such that each of said small sections provides a housing for said mirror diagonal;
    c. processing each said housing in predetermined manners;
    d. adhering a reflection mirror to said bottom seat in each said housing;
    e. sealing said two open lateral sides of each said housing with two sealing covers;
    f. mounting a first tube on said first slant face; and
    g. mounting a second tube on said second slant face.

7. The method of manufacturing mirror diagonal as claimed in claim 6, wherein said processing step includes at least cutting first and second tube mounting holes on said first and second slant faces, respectively, drilling locating screw holes on at least said first slant face into said first tube mounting hole thereon, and drilling side screw holes on said two open lateral sides and mounting holes on said sealing covers.

8. The method of manufacturing mirror diagonal as claimed in claim 7, wherein said first and said second tube are mounted in said first and said second tube mounting hole on said first and said second slant face, respectively; at least said first tube is held in place in said first tube mounting hole by threading locating screws into said locating screw holes to press against an outer peripheral surface of said first tube; and said sealing covers are connected to said open lateral sides by extending sealing screws through said mounting holes on said sealing covers into said sealing screw holes on said housing.

* * * * *